US007930410B2

(12) United States Patent
Degenkolb et al.

(10) Patent No.: US 7,930,410 B2
(45) **Date of Patent: *Apr. 19, 2011**

(54) SYSTEM AND METHOD FOR SWITCHING BETWEEN STATEFUL AND STATELESS COMMUNICATION MODES

(75) Inventors: Marko Degenkolb, Wiesloch (DE); Holger Bohle, Dielheim (DE); Ralf Halbedel, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/779,696

(22) Filed: May 13, 2010

(65) Prior Publication Data

US 2010/0223630 A1 Sep. 2, 2010

Related U.S. Application Data

(63) Continuation of application No. 11/819,243, filed on Jun. 26, 2007, now Pat. No. 7,743,157.

(51) Int. Cl.
*G06F 15/16* (2006.01)
*G06F 15/173* (2006.01)

(52) U.S. Cl. ........ 709/228; 709/203; 709/224; 709/229; 709/239

(58) Field of Classification Search .................. 709/201, 709/223, 228, 229, 240; 719/318
See application file for complete search history.

(56) References Cited

U.S. PATENT DOCUMENTS

| | | | | |
|---|---|---|---|---|
| 6,598,167 | B2 | 7/2003 | Devine et al. | |
| 7,020,678 | B1 * | 3/2006 | Hubbard | 709/201 |
| 7,020,687 | B2 | 3/2006 | Mooney et al. | |
| 7,027,975 | B1 | 4/2006 | Pazandak et al. | |
| 7,114,083 | B2 | 9/2006 | Devine et al. | |
| 7,174,381 | B2 | 2/2007 | Gulko et al. | |
| 7,191,356 | B2 | 3/2007 | Barr et al. | |
| 7,290,266 | B2 * | 10/2007 | Gladstone et al. | 719/318 |
| 7,296,077 | B2 * | 11/2007 | Harmon et al. | 709/229 |
| 7,337,236 | B2 * | 2/2008 | Bess et al. | 709/240 |
| 7,600,230 | B2 * | 10/2009 | Desai et al. | 709/228 |
| 7,657,618 | B1 * | 2/2010 | Rothstein et al. | 709/223 |
| 7,720,820 | B2 * | 5/2010 | Lomet | 707/682 |
| 7,805,523 | B2 * | 9/2010 | Mitchell et al. | 709/228 |

* cited by examiner

*Primary Examiner* — Quang N. Nguyen
(74) *Attorney, Agent, or Firm* — Kenyon & Kenyon LLP

(57) ABSTRACT

Methods and systems for specifying the state of an application interface during configuration of the business system are provided. A state controller can manage communication between application interfaces and interface proxies. Each interface proxy replicates the services exposed by an application interface associated with backend applications in a business system. The state controller allows each application to operate in a stateful mode, a stateless mode, or a combined mode. The mode for an application can be specified during configuration/installation of the business system, removing the need to specify communication modes for applications during design and development of the applications and business system. The use of an interface proxy allows user interface (frontend) application to be developed and/or configured individually, and without regard to the communication mode used by the backend applications.

12 Claims, 5 Drawing Sheets

USER INTERFACE / APPL'N 130
SERVICE 121 | SERVICE 122 | SERVICE 123
INTERFACE PROXY 120
STATE CONTROLLER 100
COMMAND QUEUE 101
STATE HANDLER 105
COMMAND BUS 102
COMMAND BUS 103
SERVICE 111 | SERVICE 112 | SERVICE 113
APPLICATION INTERFACE 115
BACKEND APPL'N(S) 110

SYSTEM AND METHOD FOR SWITCHING BETWEEN STATEFUL AND STATELESS COMMUNICATION MODES

CROSS-REFERENCE TO RELATED APPLICATIONS

This is a Continuation application of U.S. Utility application Ser. No. 11/819,243, filed Jun. 26, 2007 (now U.S. Pat. No. 7,743,157, issued Jun. 22, 2010).

BACKGROUND

Modern firms use complex business systems to define and perform the business processes used by the firms. The business system typically includes a variety of backend applications to perform related tasks and define related processes, such as inventory management, employee management, customer relations, etc. Each application makes use of a variety of business objects, which contain data and business logic to manipulate the data.

Typically, the user interface used to access these backend applications does not include any business or functional logic itself. Rather, the backend applications provide functions and services to the user interface, which provides communication between a user and the applications using the services provided by the applications. Thus, the functionality presented by the user interface is limited by the services exposed by the backend applications.

An application user interface (UI) is typically coupled to the backend applications using a request-response model. That is, the UI sends a request to the backend and waits for a resulting response. Communication between the UI and the backend applications can use a stateless connection or a stateful connection. In a stateless connection, each request is independent of each other request. That is, a later request does not use or rely on information from an earlier request. In a stateful connection, operations may be linked or related to earlier requests. For example, a later request may rely on the result of an operation resulting from an earlier request. Stateless connections generally allocate memory and network resources for each request/response cycle separately, but can result in higher response times if more data must be transported with each request or if the application has high initialization costs. Stateful connections typically have faster response times, but may impose higher memory and network connections on the back end since connections are kept open while the application is running.

It is normally necessary to specify whether an application and the corresponding UI will use a stateful connection or a stateless connection during development of the application, i.e., before it is customized and installed for a specific customer. This decision results in different design structures at various layers of the application, such as when a model/view/controller approach is used, and therefore cannot later be adjusted for a specific business system.

However, each customer may want to adjust various applications to perform in different modes than are selected when the applications are developed. For example, it may be desirable to specify some applications in a business system as stateful, and others as stateless, depending on the resources available to the system and the expected frequency and character of the use for each application. Since these factors may vary by customer and business system, it is difficult to select a communication mode that will be useful across a wide range of business systems.

One approach is to create two versions of each application and associated services, with one version designed as a stateless application, and the other as a stateful application. However, this can cause unnecessary complexity when developing the business system, since a change made to the application will have to be made in each version separately. It can also result in a system that makes inefficient use of resources. Since most businesses will only require one version of each application (stateful or stateless, depending on the specific environment), the business system may require a good deal more storage and/or processing resources than would be required if each application had a single version.

Thus there is a need in the art for systems and methods to allow for flexibility in connection mode selection for applications in a business system, where the connection and processing mode of each application can be selected during configuration or customization of the business system.

DETAILED DESCRIPTION

Methods and systems for specifying the state of an application interface during configuration of the business system are provided. A state controller can manage communication between application interfaces and interface proxies. Each interface proxy replicates the services exposed by an application interface associated with backend applications in a business system. The state controller allows each application to operate in a stateful mode, a stateless mode, or a combined mode. The mode for an application can be specified during configuration/installation of the business system, removing the need to specify communication modes for applications during design and development of the applications and business system. The use of an interface proxy allows user interface (frontend) application to be developed and/or configured individually, and without regard to the communication mode used by the backend applications.

Figure 1:
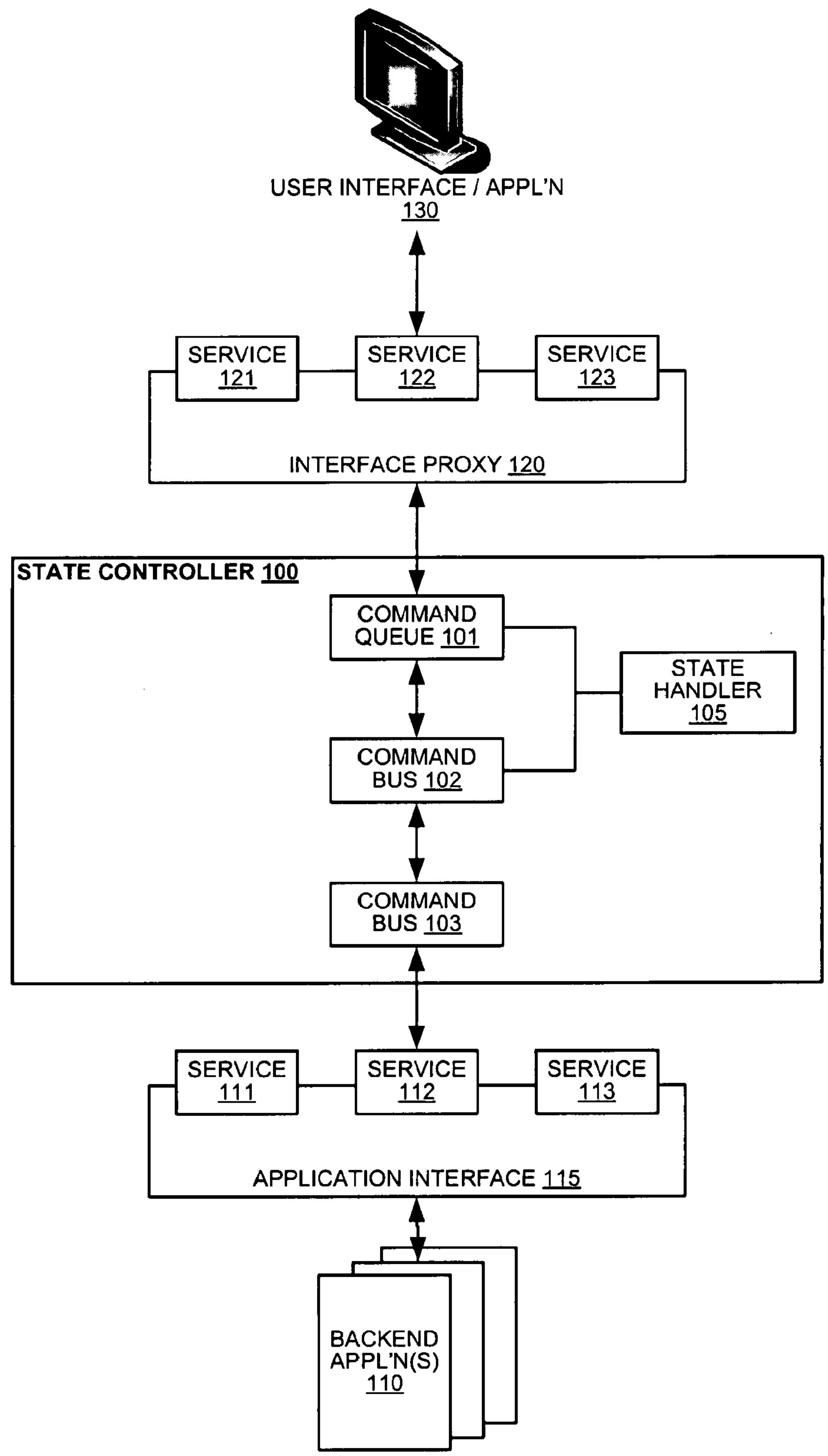
FIG. 1 shows a business system having a state controller capable of operating in multiple state modes according to an embodiment of the present invention.

FIG. 1 shows a business system with a state controller according to an embodiment of the present invention. A state controller 100 may manage communication between a user interface 130 and application interfaces 115 provided by backend applications 110. In a conventional business system, the user interface 130 typically sends requests to services 111, 112, 113 exposed by an application interface 115, and receives responses after the services are executed. In an embodiment of the present invention, an interface proxy 120 exposes services 121, 122, 123 that replicate the services 111, 112, 113 exposed by the backend application interface. Depending on whether each application interface 115 is configured to operate in a stateful or stateless mode, the state controller 100 may be configured to operate in a compatible mode when managing communication between the interface proxy 120 and the application interface 115. Since the interface proxy 120 includes services that replicate those exposed by the backend applications, the interface proxy 120 may "mask" the existence of the state controller 100 from the frontend application. This may reduce or remove the need for frontend applications to be reconfigured when placed in a system using a state controller. Thus, the frontend user interface 130 need not, and typically will not be aware of the state controller 100, or that the interface proxy 120 is not the actual application interface 115.

The state controller 100 may include a command queue 101 for queuing requests received from the interface proxy, and a command bus 102/103 to pass requests and responses across a "state boundary." The command queue and command bus may perform different operations with respect to a series of requests and responses depending on the configuration of the state controller 100. The operations performed for each configured mode may be specified by a state handler 105. For example, the state handler 105 may read a configuration file that defines operation modes for a particular application interface 115, and instruct the command queue 101 and command bus 102/103 to perform according to a predefined mode based on whether the state controller 100 is configured for stateful or stateless operation with respect to the identified application interface.

When a user performs an operation in the frontend application 130 requiring communication with a backend application, the frontend application (user interface) 130 may send a request to the interface proxy 120. The request is passed to the state controller 100 which, depending on the configuration of the state controller, may handle the request in a number of ways. In an embodiment of the invention, the state controller may be configured to operate in a stateful mode, a stateful-over-stateless mode, and/or a stateless mode. A "user operation" may involve multiple user interactions such as entering data, operating a user interface control and the like, all of which are part of the same discrete usage of an application.

Figure 2:
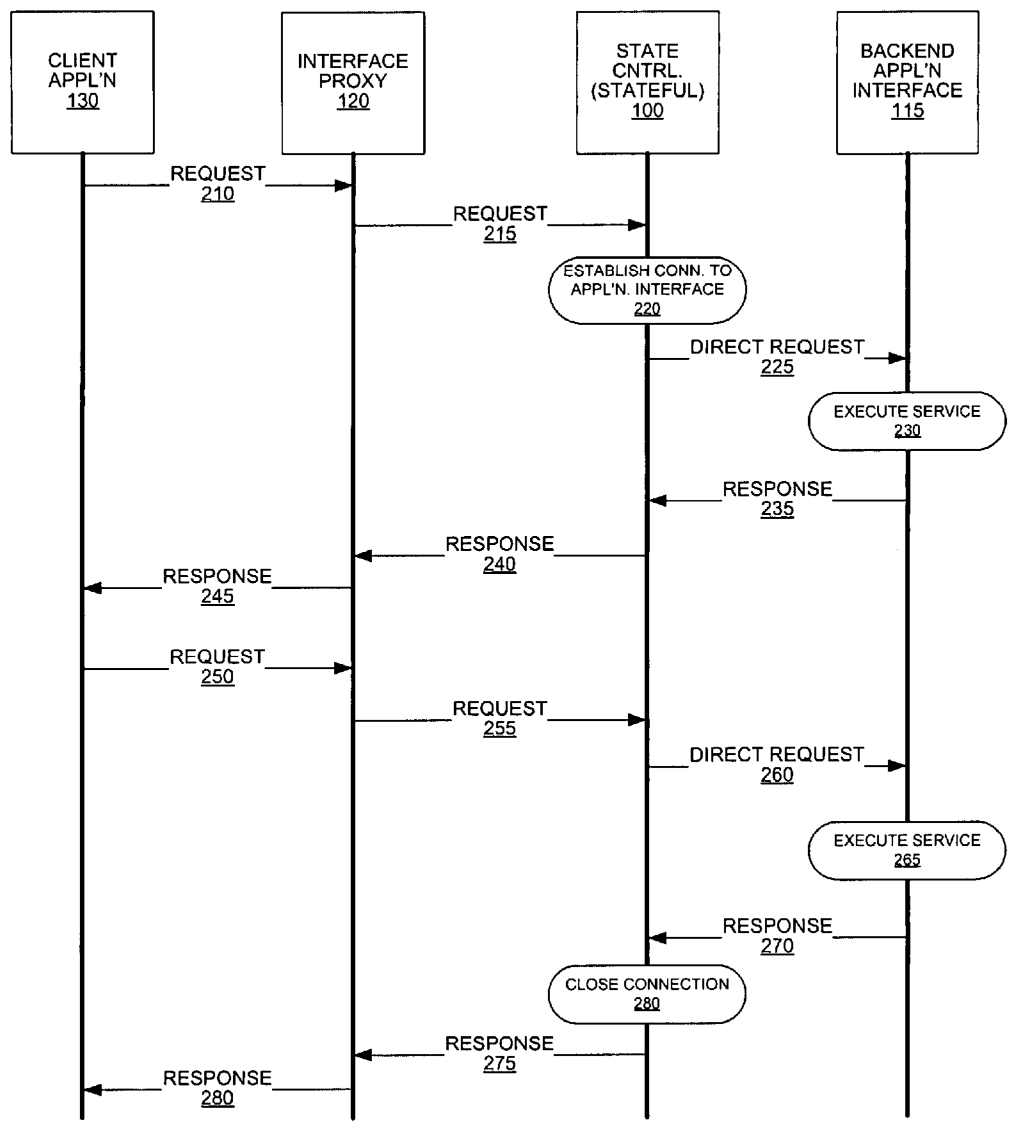
FIG. 2 shows an exemplary request/response sequence using a state controller operating in a stateful mode according to an embodiment of the present invention.

FIG. 2 shows an exemplary request/response sequence using a state controller operating in a stateful mode according to an embodiment of the present invention. A client application 130 may send a request 210 to an interface proxy 120, which passes the request 215 to a state controller 100. When the state controller receives a request, it may establish a connection to the appropriate application interface 220 identified in the request. In a stateful mode, the state controller may operate in a "short circuit" mode, where the request is directly passed 225 to the backend application. The backend application may then execute an appropriate service 230 required to process the request, and send a response 235 to the state controller, which is then passed to the client application via the interface proxy (response 240, 245). If the client application sends a second request 250 related to the same user operation, the request may be passed through the interface proxy (request 255) to the state controller. Since, in a stateful mode, the state controller may operate in a short circuit mode, the request again may be passed directly to the backend application interface (direct request 260). The backend application may then execute an appropriate service 265, and return a response to the user application via the state controller and interface proxy (responses 270, 275, 280). After the response 270 is received by the state controller, it may close the connection 260 to the backend application. When operating in a stateful mode, the state controller typically will maintain a single connection with the application interface until all the requests/responses associated with a single user operation are complete. A single operation may include more than one request-response exchange, as illustrated in FIG. 2.

Figure 3:
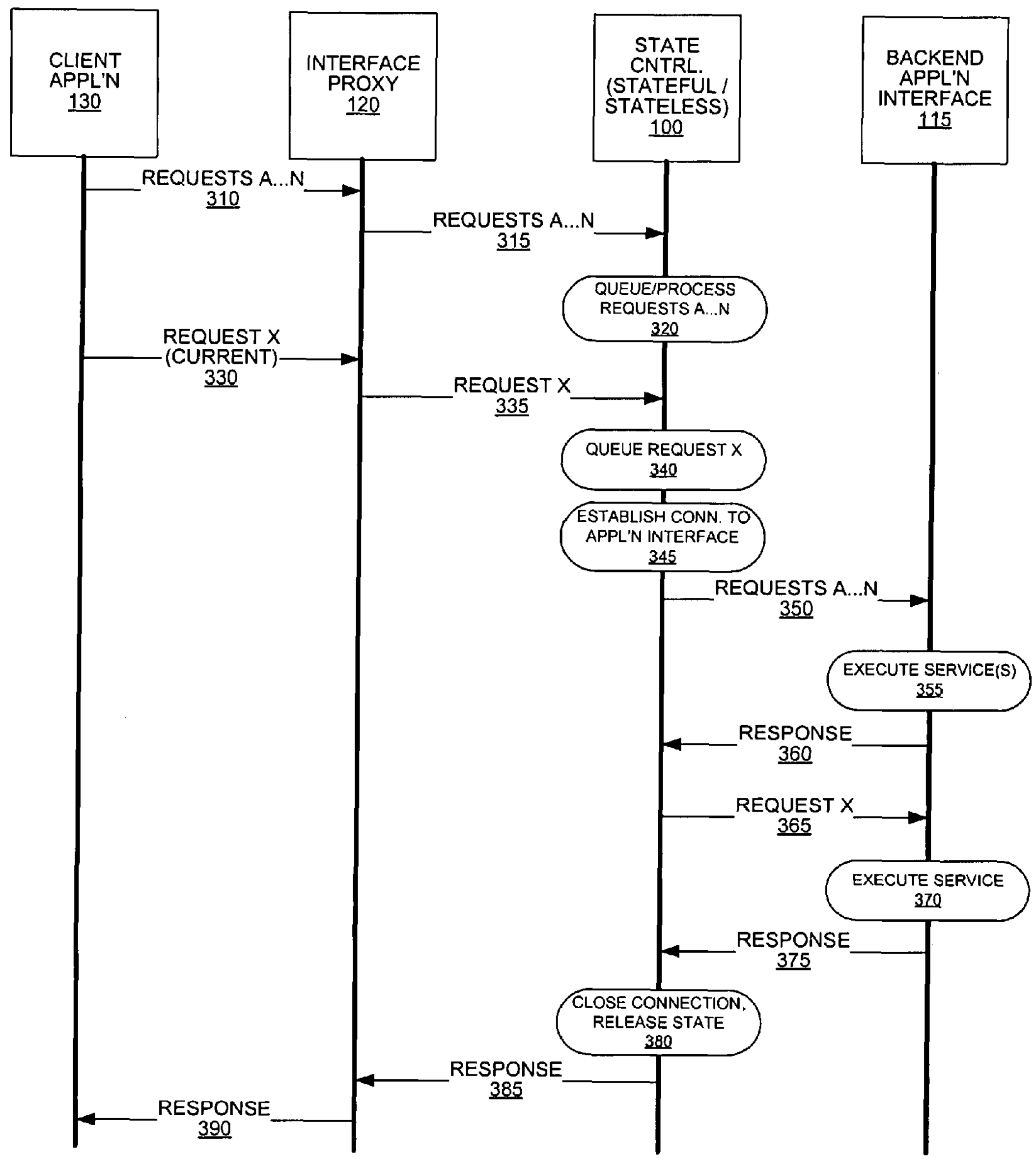
FIG. 3 shows an exemplary request/response sequence using a state controller operating in a combined stateful-over-stateless mode according to an embodiment of the invention.

The state controller also may be configured to operate in a stateful-over-stateless mode. FIG. 3 shows an exemplary request/response sequence using a state controller operating in a combined stateful-over-stateless mode according to an embodiment of the invention. In this mode, requests received by the state controller are queued in a command queue so that the state of backend applications can be restored before a new request is processed. For example, a user operation may involve several requests A-N and X. At some time prior to sending request X, requests A-N are sent to state controller via the interface proxy 310, 315. These requests are queued in a command queue 320, and also may be processed by the appropriate backend application (not shown). At a later time, the client application may send an additional request X to the state controller via the interface proxy 330, 335. The state controller may then queue the request 340 in the command queue, which already has the previous requests A-N queued. The state controller may establish a connection to the application interface 345. In contrast to conventional operation and to other state-related operation modes, the state controller may initially send requests A-N to the application interface 350. In some cases, these requests may have been previously sent to the application interface and processed. If necessary, the backend application may execute services associated with requests A-N 355; this returns the application interface to the appropriate state for processing request X. The state controller may "know" that the application interface is in the appropriate state for processing request X when it receives a response 360 to requests A-N, indicating that these requests have been processed, such as by execution of the appropriate services or otherwise changing the state of the backend application. The state controller then may send request X to the application interface 365, and the appropriate service may be executed 370. After a response is received 375 indicating that request X has been processed (i.e., the appropriate service has been executed), the state controller may close the connection to the backend application and release the state of the backend application 380. In an embodiment, the state may be released after each request, even when the user operation is not completed. Since requests are queued, the state of the application interface may be restored at any time by re-sending the queued requests; this it is not necessary to maintain state between requests of a single user operation. The state controller may send a response to the client application via the interface proxy 385, 290, to indicate that request X has been processed.

Figure 4:
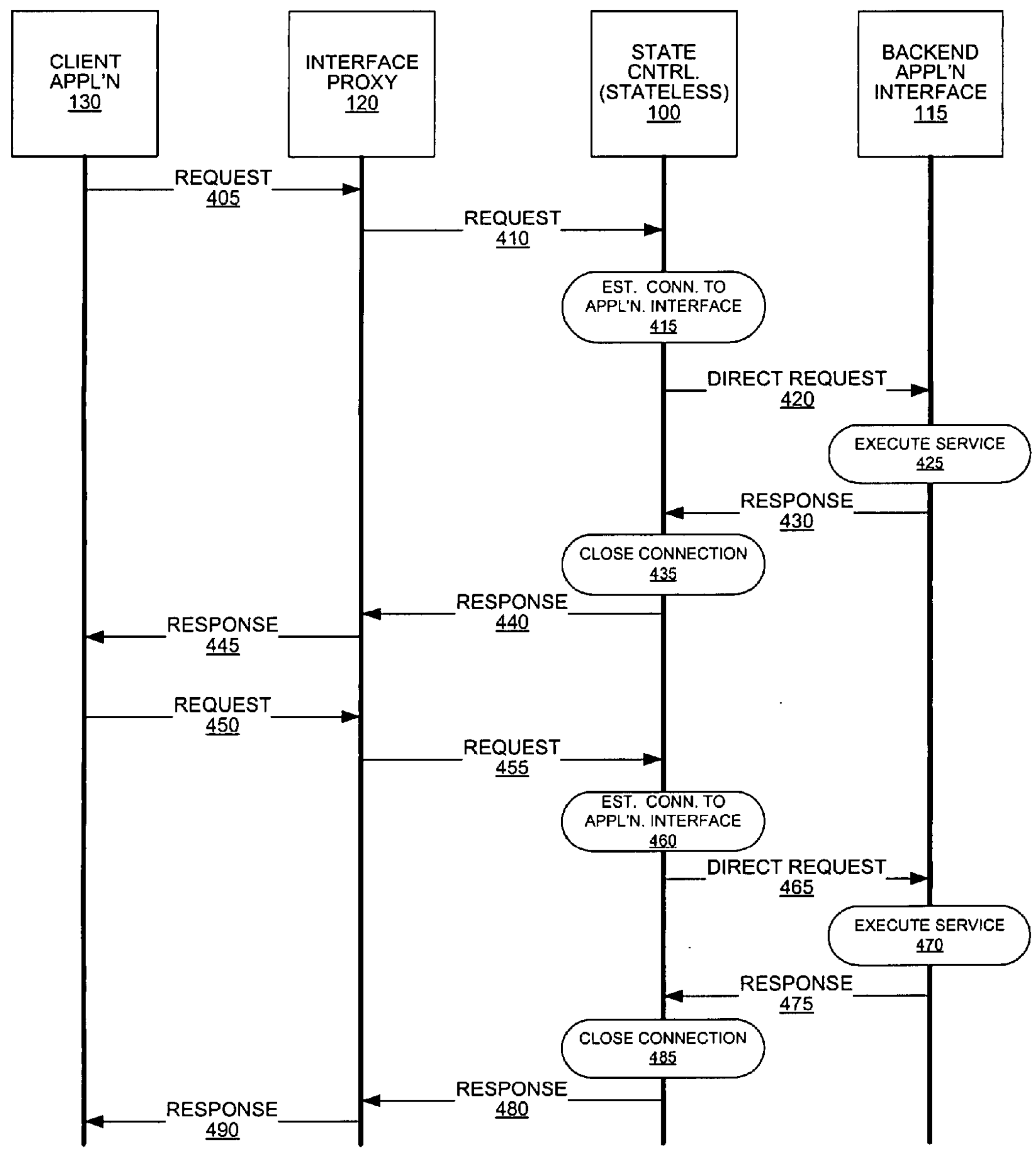
FIG. 4 shows an exemplary request/response sequence using a state controller operating in a stateless mode according to the present invention.

In an embodiment of the present invention, the state controller may operate in a completely stateless mode. The operation of the state controller in a stateless mode may be similar to the operation used in a stateful mode as described with respect to FIG. 2, in that the state controller may operate in a "short circuit" fashion. However, where the state controller maintains a single connection to the application interface for multiple requests in a stateful mode, a separate connection is established for each request in a stateless mode. FIG. 4 shows an exemplary request/response sequence using a state controller operating in a stateless mode according to the present invention. A first request may be sent to the state controller via the interface proxy 405, 410. After a request is received, the state controller may establish a connection to the application interface 415 and send the request to the interface 420. As previously described, the state controller may pass the request directly to the application interface. The application may execute the appropriate service 425, and return a response 430 to the state controller. After a response is received, the state controller may close the connection 435 to the application interface, and send the response to the client application via the interface proxy 440, 445. When a second request is sent from the client application to the state controller 450, 455, the same process may be used. That is, the state controller may establish a second connection to the application interface 460 and pass the request through to the interface 465. When the appropriate service has been executed by the backend application 470 and a response received 475 by the state controller, the state controller may close the second connection 485. As previously described, the state controller may send pass the response through to the client application 480, 490.

Figure 5:
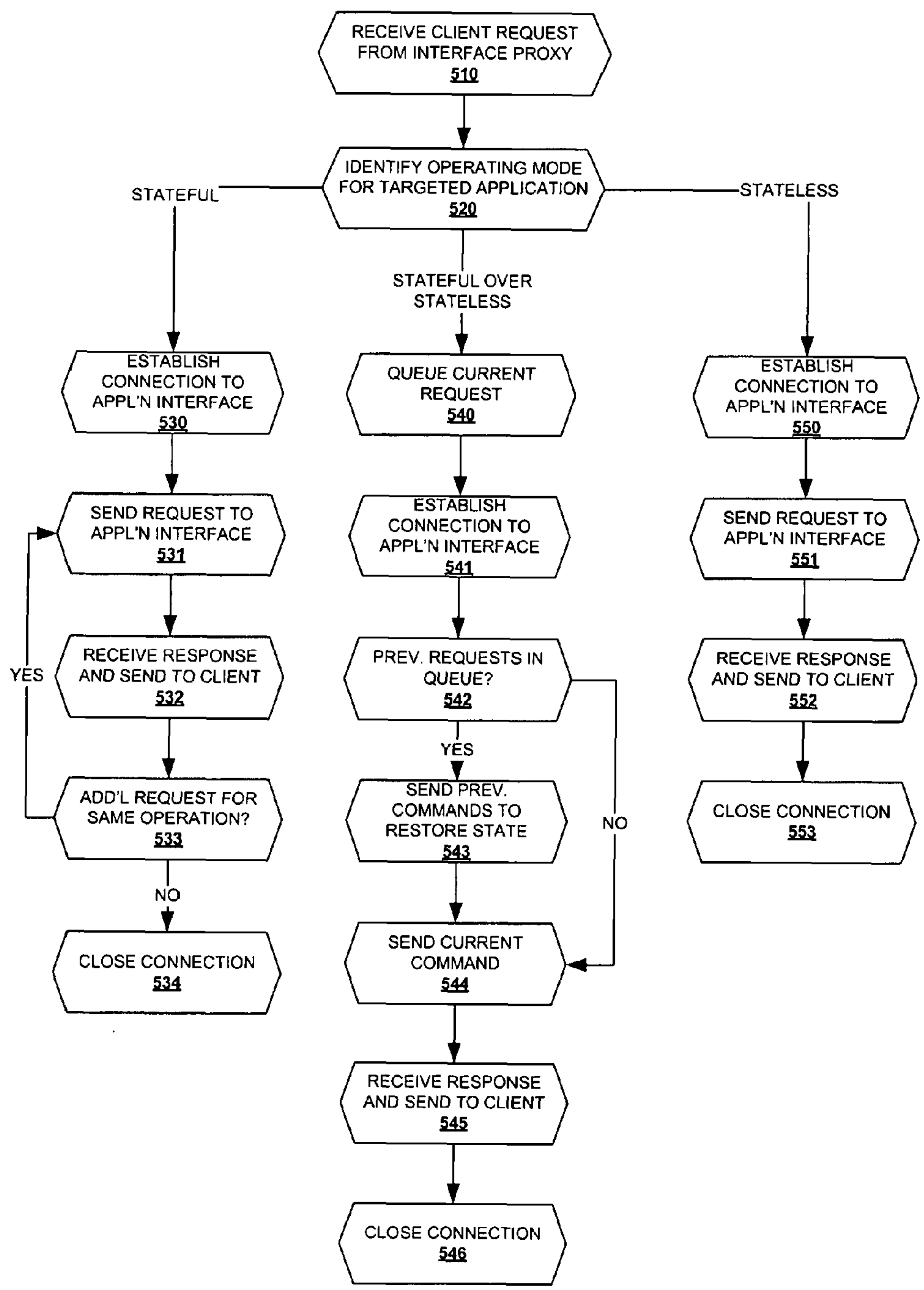
FIG. 5 shows an exemplary process for processing requests sent to backend applications according to an embodiment of the present invention.

The state controller may be configured to operate in a different mode for each application in the business system. In contrast to conventional business systems, the operating mode of each application, and therefore the modes for which the state controller is configured, may be defined during installation and/or customization of the business system, as opposed to during development. FIG. 5 shows an exemplary process for processing requests sent to backend applications according to an embodiment of the present invention. When a state controller receives a client request from an interface proxy 510, it may determine the appropriate mode in which to operate based on the mode configured for the backend application referenced by the request 520. For example, the state controller may consult a file that defines an operation mode for each application in the system. If the state controller is configured to operate in a stateful mode, it may establish a connection to the appropriate application interface 530 and send the request to the application interface 531. After the appropriate backend service is executed, the state controller may receive a response and forward the response to the client application 532. If the client operation requires additional requests, or other requests are received for a single client operation 533, these requests may be sent to the backend over the same connection. Once the user operation is complete, the connection to the backend may be closed 534. In an embodiment, the connection also may be maintained throughout the lifetime of the client application.

If the state controller is configured to operate in a stateful-over-stateless mode, the state controller may queue the request in a command queue 540 and establish a connection to the appropriate application interface 541. If there are previous requests in the command queue 541, the previous requests may be sent to the backend application to restore it to the appropriate state 543. After state has been restored in the backend application, the state controller may send the current command to the application interface 544. The state controller may return any response received from the application interface to the client application 545, and close the connection 546 to the backend.

In a stateless mode, the state controller may use a separate connection for each request. That is, after establishing a connection to the application interface 550 and sending passing the request to the interface 551, the state controller may send any response to the client application 552 and close the connection 553. If subsequent requests are received, the state controller may establish a separate connection to the backend.

As will be understood by one of skill in the art, many of the operations described herein may be performed in a different order than that described. For example, when a connection between a state controller and a backend application is to be closed, the state controller may send a response to an interface proxy before or after closing the connection.

The various computer systems described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art.

What is claimed is:

1. A method for executing a request in a business system, comprising:

receiving a request, from a user operation, directed to a backend application from an interface proxy, the interface proxy replicating services exposed by the backend application;

identifying a communication mode associated with the backend application, the communication mode defining whether the backend application is to maintain state between consecutive requests generated by the same user operation;

if the communication mode is a stateful-over-stateless mode, the request is queued with previous requests generated by the same user operation in a command queue;

opening a connection to the backend application;

if the command queue contains previous requests for the same user operation as the request, sending the previous requests to the backend application prior to sending the request to the backend application;

sending the request to the backend application, wherein the sending further comprising transferring the request to the backend application over a state boundary; and if the backend application is to maintain state between consecutive requests, keeping the connection open until the user operation is complete.

2. The method of claim 1, wherein the communication mode is a stateful mode.

3. The method of claim 1, wherein the communication mode is a stateless mode.

4. The method of claim 1, wherein the communication mode is a stateful-over-stateless mode.

5. An apparatus comprising:

a command queue to collect communication requests from an interface proxy, the interface proxy replicating services exposed by a backend application interface;

a command bus to transport requests between the command queue and the backend application interface; and a state handler to control connections and specify communication modes between the command bus and the application interface;

wherein the state handler performs:

receiving a request, from a user operation, directed to the backend application interface from the interface proxy;

identifying a communication mode associated with the backend application interface, the communication mode defining whether the backend application interface is to maintain state between consecutive requests generated by the same user operation;

if the communication mode is a stateful-over-stateless mode, the request is queued with previous requests generated by the same user operation in the command queue;

opening a connection to the backend application interface;

if the command queue contains previous requests for the same user operation as the request, sending the previous requests to the backend application interface prior to sending the request to the backend application interface;

sending the request to the backend application interface, wherein the sending further comprising transferring the request to the backend application interface over a state boundary; and if the backend application interface is to maintain state between consecutive requests, keeping the connection open until the user operation is complete.

6. The apparatus of claim 5, wherein the state handler switches communication mode based on a configuration file specifying a communication mode for the backend application interface.

7. The apparatus of claim 5, wherein the command queue is to store requests associated with a single user operation.

8. The apparatus of claim 5, wherein the state handler is operable in stateful, stateless, and stateful-over-stateless communication modes.

9. A non-transitory computer readable storage medium storing thereon program instructions that, when executed, cause an executing device to:

receive a request, from a user operation, directed to a backend application from an interface proxy, the interface proxy replicating services exposed by the backend application;

identify a communication mode associated with the backend application, the communication mode defining whether the backend application is to maintain state between consecutive requests generated by the same user operation;

if the communication mode is a stateful-over-stateless mode, the request is queued with previous requests generated by the same user operation in a command queue;

open a connection to the backend application;

if the command queue contains previous requests for the same user operation as the request, send the previous requests to the backend application prior to sending the request to the backend application;

send the request to the backend application, wherein the sending further comprising transferring the request to the backend application over a state boundary; and if the backend application is to maintain state between consecutive requests, keep the connection open until the user operation is complete.

10. The computer readable storage medium of claim 9, wherein the communication mode is a stateful mode.

11. The computer readable storage medium of claim 9, wherein the communication mode is a stateless mode.

12. The computer readable storage medium of claim 9, wherein the communication mode is a stateful-over-stateless mode.

* * * * *